Nov. 28, 1944.　　　T. McL. JASPER　　　2,363,967
MULTILAYER VESSEL
Filed May 2, 1942
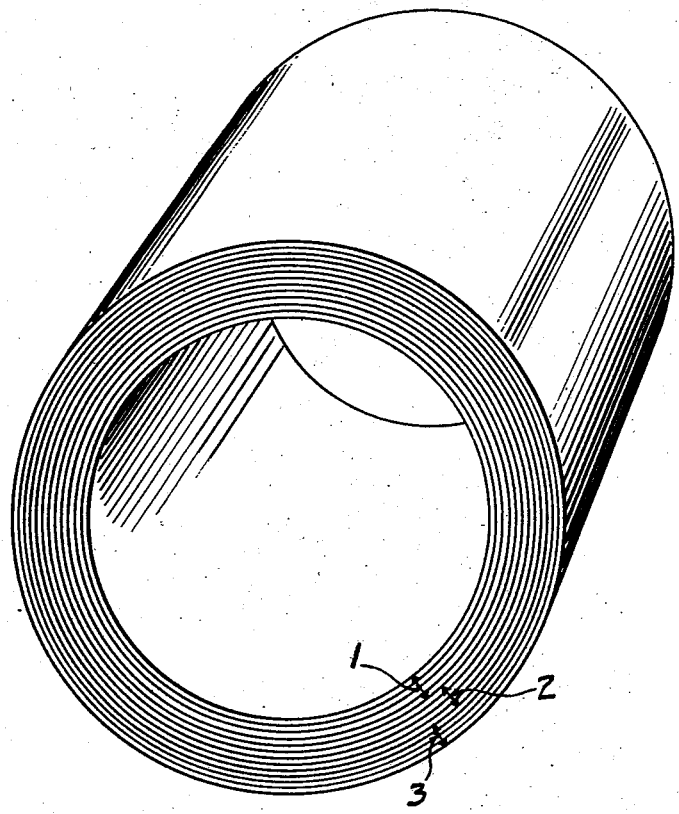
Thomas McLean Jasper
INVENTOR.
BY
ATTORNEY.

Patented Nov. 28, 1944

2,363,967

UNITED STATES PATENT OFFICE 2,363,967

MULTILAYER VESSEL

Thomas McLean Jasper, Milwaukee, Wis., assignor to A. O. Smith Corporation, Milwaukee, Wis., a corporation of New York Application May 2, 1942, Serial No. 441,520

2 Claims. (Cl. 220—3)

This invention relates to a multi-layer vessel, and is directed to a construction which compensates for the different rates of stressing of the inner and outer layers of vessels that are comparatively thick for their diameter.

As is known with single plate pressure vessels having a diameter to wall thickness ratio less than about ten, the metal at the inner surface of the vessel wall is stressed higher in service than that at the outer surface of the vessel wall. The formula employed for cylindrical walls to determine the stress at any given location in the thickness of the wall is known as the Lamé formula, and may be stated as follows:

$$S = \frac{PR_1^2(R_2^2 + R^2)}{R^2(R_2^2 - R_1^2)}$$

in which:

S denotes the circumferential tensile stress in pounds per square inch at any given point in the section;
P denotes the internal fluid pressure in pounds per square inch on the inside of the cylinder;
R denotes the radius in inches at the point of stress;
$R_1$ denotes the inside radius of the section in inches; and
$R_2$ denotes the outside radius of the section in inches.

The same general formula may be expected to apply to multi-layer pressure vessels where the layers are not placed under a prestressed condition. Such vessels have been constructed under the United States patent to R. Stresau, No. 1,925,118. Various methods of fabricating such vessels have been proposed for prestressing the layers of the vessels in a manner tending to compensate for this unequal rate of stressing in service.

The principal object of the present invention is to provide a multi-layer vessel construction which substantially compensates for the stress differential referred to and which does not need to have the steel initially stressed. This enables the full strength of each sheet of the steel to be utilized in computing the working pressure.

Another object is to provide a stronger and lighter-weight multi-layer pressure vessel.

In carrying out the invention, the inner layers of the vessel are constructed of stronger metal than the outer layers. This greater strength in the inner layers may be obtained by cold working or heat treating the sheets from which the layers are constructed, but preferably it is obtained by employing low alloy steel sheets of initially greater strength than the steel of the outer layers.

A multi-layer cylinder for pressure vessels embodying the invention is illustrated in the accompanying drawing in which the single figure is a perspective view of such a cylinder.

The cylinder is fabricated by the method described in the Stresau patent referred to above, by first rolling and welding the inner sheet of metal, and thereafter applying and welding subsequent sheets of metal successively to provide a vessel of many layers tightly fitting upon one another so that the load applied to the inner layer from internal fluid pressure in service will be efficiently transferred and spread between the several layers. The sheets of metal should be sufficiently thin for the diameter of the shell to avoid the characteristics of a rigid single plate heavy wall construction. In practice, for vessels having an inside diameter of about three feet, the layers or sheets are preferably about one-quarter or five-sixteenths of an inch thick. The layers need not all be of the same thickness. One or more layers may be substantially thicker than the rest.

In carrying out the invention the first few layers 1, say up to about one-third of the thickness of the vessel wall, are constructed of a high strength metal such as a low alloy steel or of cold rolled or heat treated steel. The balance of the layers of metal may be constructed of ordinary steel, or, as illustrated in the drawing, may be divided and the next group of layers 2 be constructed of a medium strength steel and the outer group of layers 3 constructed of a relatively low strength steel.

As an illustration of the invention it is suggested that the layers of group 1 be constructed of a steel having a minimum tensile strength of about 100,000 lbs. per square inch, the layers of group 2 be constructed of a steel having a minimum tensile strength of about 80,000 lbs. per square inch, and the layers of group 3 be constructed of a steel having a minimum tensile strength of about 60,000 lbs. per square inch.

Such a vessel will when loaded in service have its several layers stressed more nearly in proportion to the yield point of the metal of the several layers and a greater efficiency will be obtained. For all practical purposes the different strengths of the several layers will furnish protection against the different rates of stress increase under load.

Theoretically, in carrying out the principle of the invention, it would be desirable to employ a different strength metal for each layer, the variation in strength being gradual from a maximum in the inner layer to a minimum in the outer layer. However, such a vessel would be relatively costly, and for all practical purposes a vessel such as that illustrated having two or three different strengths of metal is entirely satisfactory. With extremely thick-walled vessels of many layers, it may be practical and of advantage to employ a larger number of groups of layers of different strengths.

The several layers are stressed more nearly according to the factor of safety to which the vessel is designed and there is less danger of any of the layers being overloaded in service. The full strength of the several layers provide the desired factor of safety while withstanding the internal working pressures.

Various embodiments of the invention may be employed within the scope of the accompanying claims.

The invention is claimed as follows:

1. A multi-layer high pressure cylindrical shell of the class described having a diameter to wall thickness ratio less than about ten, comprising many superimposed cylindrical layers of metal of uniform thickness, substantially free of pre-stress and disposed concentrically one within another in tight pressure contact with one another throughout at all times, the inner layers of the shell being composed of metal of higher strength than that of the outer layers to compensate for the difference in rate of stress increase in the several layers when internal fluid pressure is applied to the shell.

2. A multi-layer high pressure cylindrical shell of the class described having a diameter to wall thickness ratio less than about ten, comprising many superimposed cylindrical layers of metal of uniform thickness, substantially free of pre-stress and disposed concentrically one within another in tight pressure contact with one another throughout at all times, said layers of metal being composed of at least three groups, the inner groups of layers being of metal of greater strength than the metal of the next adjacent group of layers, and similarly with each successive group, the outer group of layers being of metal of the least strength, to provide a shell in which the unit strength of the metal of the respective layers is more nearly proportional to the stressing of the respective layers in service.

T. McLEAN JASPER.